(12) United States Patent
Higuchi et al.

(10) Patent No.: US 10,730,219 B2
(45) Date of Patent: Aug. 4, 2020

(54) METHOD FOR PRODUCING FLUORORESIN FILM

(71) Applicant: AGC Inc., Chiyoda-ku (JP)

(72) Inventors: Yoshiaki Higuchi, Chiyoda-ku (JP); Seigo Kotera, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 216 days.

(21) Appl. No.: 15/786,787

(22) Filed: Oct. 18, 2017

(65) Prior Publication Data

US 2018/0036931 A1 Feb. 8, 2018

Related U.S. Application Data

(63) Continuation of application No. PCT/JP2016/071905, filed on Jul. 26, 2016.

(30) Foreign Application Priority Data

Aug. 4, 2015 (JP) .................................. 2015-153854

(51) Int. Cl.
  *B29C 48/08* (2019.01)
  *B29C 48/30* (2019.01)
  (Continued)

(52) U.S. Cl.
  CPC .......... *B29C 48/08* (2019.02); *B29C 48/2511* (2019.02); *B29C 48/2515* (2019.02);
  (Continued)

(58) Field of Classification Search
  CPC .................... B29C 48/2511; B29C 48/9135
  See application file for complete search history.

(56) References Cited

U.S. PATENT DOCUMENTS

| | | | |
|---|---|---|---|
| 2004/0232580 A1* | 11/2004 | Defeo | C08F 214/26 264/40.6 |
| 2004/0260044 A1* | 12/2004 | Earnest, Jr. | C08F 214/18 526/247 |

(Continued)

FOREIGN PATENT DOCUMENTS

| | | |
|---|---|---|
| JP | 2004-306549 A | 11/2004 |
| JP | 2007-314720 A | 12/2007 |

(Continued)

OTHER PUBLICATIONS

Moseley, John, Use of Melt Flow Rate Test in Reliability Study of Thermoplastic (2011), Figure 5 (Year: 2011).*

(Continued)

*Primary Examiner* — Jacob T Minskey
*Assistant Examiner* — Virak Nguon
(74) *Attorney, Agent, or Firm* — Oblon, McClelland, Maier & Neustadt, L.L.P.

(57) ABSTRACT

To provide a method for producing a fluororesin film, whereby defects due to deterioration (such as fish-eyes due to gelation) of a melt-processable fluororesin are less likely to occur during the production. A method for producing a fluororesin film, which comprises extruding a fluororesin material containing a melt-processable fluororesin through an extruder die, wherein the temperature of the extruder die is from 305 to 355° C., and the average flow velocity $v_{0.95}$ of the fluororesin material as obtained by $v_{0.95}=Q_{0.95}/A_{0.95}$, is at least $1\times10^{-4}$ m/sec. Here, when the distance from the flow inlet 22 of the extruder die to the end of the manifold 24 of the extruder die is set to be x=1, $Q_{0.95}$ is the flow rate (m³/sec) of the fluororesin material flowing in the manifold 24 at a position of x=0.95 from the flow inlet 22, and $A_{0.95}$ is the cross-sectional area (m²) of the manifold 24 at a position of x=0.95 from the flow inlet 22.

20 Claims, 2 Drawing Sheets

(51) Int. Cl.
*B29C 48/305* (2019.01)
*B29C 48/25* (2019.01)
*C08F 214/26* (2006.01)
*B29C 48/92* (2019.01)
*C08F 214/18* (2006.01)
*B29K 27/12* (2006.01)
*B29L 7/00* (2006.01)
*B29C 48/88* (2019.01)
*B29C 48/00* (2019.01)

(52) U.S. Cl.
CPC .......... *B29C 48/30* (2019.02); *B29C 48/3001* (2019.02); *B29C 48/305* (2019.02); *B29C 48/92* (2019.02); *C08F 214/18* (2013.01); *C08F 214/262* (2013.01); *C08F 214/265* (2013.01); *B29C 48/022* (2019.02); *B29C 48/914* (2019.02); *B29C 2948/926* (2019.02); *B29C 2948/92704* (2019.02); *B29C 2948/92904* (2019.02); *B29K 2027/12* (2013.01); *B29L 2007/008* (2013.01)

(56) References Cited

U.S. PATENT DOCUMENTS

| | | | | |
|---|---|---|---|---|
| 2006/0237864 | A1* | 10/2006 | Morita | B29C 48/08 264/1.34 |
| 2010/0034919 | A1* | 2/2010 | Brothers | B32B 27/08 425/461 |
| 2010/0311906 | A1* | 12/2010 | Lavallee | B29C 48/08 525/55 |
| 2011/0040021 | A1* | 2/2011 | Kaspar | C08L 27/18 524/520 |
| 2012/0258270 | A1* | 10/2012 | Chang | B29C 33/62 428/36.92 |
| 2015/0252156 | A1* | 9/2015 | Kouketsu | H01L 31/0481 526/253 |

FOREIGN PATENT DOCUMENTS

| | | |
|---|---|---|
| JP | 2010-030238 A | 2/2010 |
| JP | 2011-530627 A | 12/2011 |
| JP | 2014-141646 | 8/2014 |
| WO | WO 2010/079723 A1 | 7/2010 |
| WO | WO 2013/094752 A1 | 6/2013 |
| WO | WO 2015/080260 A1 | 6/2015 |

OTHER PUBLICATIONS

Giles, Harold, Extrusion—The Definitive Processing Guide and Handbook (2005), pp. 435-440 (Year: 2005).*

International Search Report dated Sep. 13, 2016 in PCT/JP2016/071905 filed Jul. 26, 2016.

* cited by examiner

METHOD FOR PRODUCING FLUORORESIN FILM

TECHNICAL FIELD

The present invention relates to a method for producing a fluororesin film.

BACKGROUND ART

A fluororesin is a material having a relatively high thermal stability and is used in applications in which its heat resistance, chemical resistance, etc. are utilized. Recently, a fluororesin having adhesive functional groups has been proposed and has attracted attention as a printed circuit board material by taking advantage of its characteristics such as heat resistance, low dielectric constant, low dielectric loss, etc. (Patent Document 1).

PRIOR ART DOCUMENT

Patent Document

Patent Document 1: WO2015/080260

DISCLOSURE OF INVENTION

Technical Problem

With a melt-processable fluororesin, it is possible to produce a fluororesin film by extruding the fluororesin through an extrusion die. However, the fluororesin has a high melting point, and thus, when exposed to a high temperature during the film production, the fluororesin is likely to be deteriorated and is susceptible to problems due to deterioration. For example, a fluororesin having adhesive functional groups, is poor in thermal stability because of the reactivity of the adhesive functional groups, and thus, the fluororesin is liable to gelation, and defects such as fish-eyes due to gelation are likely to occur.

The present invention has an object to provide a method for producing a fluororesin film, whereby defects due to degradation (such as fish-eyes due to gelation) of a melt-processable fluororesin are less likely to occur during the production.

Solution to Problem

The present invention provides a method for producing a fluororesin film having the following constructions [1] to [10].

[1] A method for producing a fluororesin film, which comprises extruding a fluororesin material containing a melt-processable fluororesin through an extrusion die, wherein
the temperature of the extrusion die is from 305 to 355° C., and
the average flow velocity $v_{0.95}$ of the fluororesin material as obtained by the following formula (1) is at least $1 \times 10^{-4}$ m/sec.:

$$v_{0.95} = Q_{0.95}/A_{0.95} \quad (1)$$

wherein when the distance x from the flow inlet of the extrusion die to the end portion of the manifold of the extrusion die, is set to be 1,
$Q_{0.95}$ is the flow rate (m³/sec.) of the fluororesin material flowing in the manifold at a position of x=0.95 from the flow inlet, and
$A_{0.95}$ is the cross-sectional area (m²) of the manifold at a position of x=0.95 from the flow inlet.

[2] The method for producing a fluororesin film according to [1], wherein the melt flow rate of the fluororesin at the above temperature of the extrusion die and at a load of 49N, is at least 7 g/10 min.

[3] The method for producing a fluororesin film according to [1] or [2], wherein the melt flow rate stability $S_{60}$ of the fluororesin as obtained by the following formula (2) is from 0.7 to 1.3:

$$S_{60} = MFR_{60}/MFR_0 \quad (2)$$

wherein $MFR_{60}$ is a melt flow rate of the fluororesin at the above temperature of the extrusion die and at a load of 49N as measured with respect to the fluororesin after heating for 60 minutes at the above temperature of the extrusion die in an air atmosphere, and
$MFR_0$ is a melt flow rate of the fluororesin at the above temperature of the extrusion die and at a load of 49N as measured with respect to the fluororesin before heating for 60 minutes at the above temperature of the extrusion die.

[4] The method for producing a fluororesin film according to any one of [1] to [3], wherein the melt flow rate of the fluororesin at 372° C. and at a load 49N as measured in accordance with JIS K7210; 1999, is from 20 to 70 g/10 min.

[5] The method for producing a fluororesin film according to any one of [1] to [4], wherein the extrusion die is a coat hanger type die.

[6] The method for producing a fluororesin film according to any one of [1] to [5], wherein the lip opening of the extrusion die is from 0.5 to 3.0 mm.

[7] The method for producing a fluororesin film according to any one of [1] to [6], wherein the fluororesin is a fluororesin having adhesive functional groups.

[8] The method for producing a fluororesin film according to any one of [1] to [7], wherein the fluororesin is a copolymer having units derived from tetrafluoroethylene, units derived from a monomer having an adhesive functional group, and units derived from a fluorinated monomer (but excluding said tetrafluoroethylene).

[9] The method for producing a fluororesin film according to [8], wherein the monomer having an adhesive functional group is a monomer having a cyclic acid anhydride group.

[10] The method for producing a fluororesin film according to [8] or [9], wherein the fluorinated monomer is hexafluoropropylene or a monomer represented by $CF_2=CFOR^{f1}$ (wherein $R^{f1}$ is a $C_{1-10}$ perfluoroalkyl group, or a group having an etheric oxygen atom between carbon atoms of a $C_{2-10}$ perfluoroalkyl group).

Advantageous Effects of Invention

According to the method for producing a fluororesin film of the present invention, defects due to deterioration (such as fish-eyes due to gelation) of a melt-processable fluororesin are unlikely to occur in the fluororesin film during the production.

DESCRIPTION OF EMBODIMENTS

Figure 1:
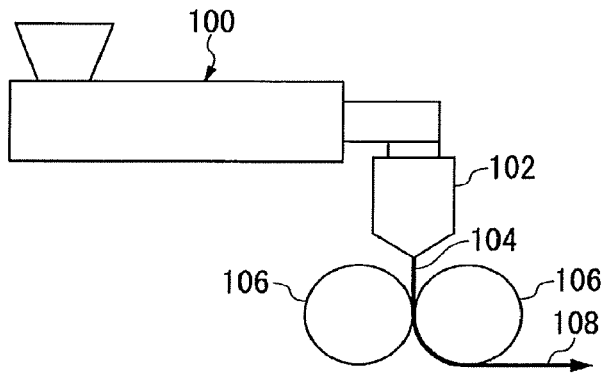
FIG. 1 is a schematic diagram showing an example of an apparatus for producing a fluororesin film.

Being "melt-processable" is meant to show melt flowability.

To "show melt flowability" means that under a load of 49N at a temperature of at least the melting point of the resin, there exists a temperature at which the melt flow rate would be in a range of from 0.1 to 1,000 g/10 min.

A "melting point" is meant for a temperature corresponding to the maximum value of the melting peak as measured by a differential scanning calorimetry (DSC) method.

A "melt flow rate" is meant for a melt mass flow rate (MFR) as defined in JIS K7210; 1999 (ISO 1133; 1997).

The term "units" is meat for structural units derived from a monomer, formed by polymerization of the monomer. Units may be structural units formed directly by a polymerization reaction, or may be structural units having a part of such units converted to another structure by treating the polymer. Further, the name of units may be represented by the monomer name having "units" attached thereto.

An "acid anhydride group" is meant for a group represented by —C(=O)—O—C(=O)—.

[Method for Producing Fluororesin Film]

The method for producing a fluororesin film of the present invention is a method for producing a fluororesin film by extruding a fluororesin material containing a melt-processable fluororesin from an extrusion die, and is characterized in that the temperature of the extrusion die is set to be in a specific range, and the flow rate of the fluororesin material flowing in the manifold of the extrusion die is set to be in a specific range.

(Melt-Processable Fluororesin)

As the melt-processable fluororesin, those known may be mentioned, and, for example, a tetrafluoroethylene/fluoroalkyl vinyl ether type copolymer (PFA), a tetrafluoroethylene/hexafluoropropylene-type copolymer (FEP), an ethylene/tetrafluoroethylene-type copolymer (ETFE), a polyvinylidene fluoride (PVDF), a polychlorotrifluoroethylene (PCTFE), an ethylene/chlorotrifluoroethylene-type copolymer (ECTFE), an adhesive fluororesin as described later, etc. may be mentioned.

As the melt-processable fluororesin, preferred is a fluororesin having adhesive functional groups (hereinafter referred to also as an adhesive fluororesin), from the viewpoint of excellent adhesion of a layer containing the melt-processable fluororesin and another layer (such as a polyimide film, glass cloth, metal foil, etc.) when formed into a laminate.

The adhesive functional group may, for example, be a carbonyl group-containing group (a carboxy group, an acid anhydride group, a haloformyl group, a keto group, a carbonate group, an amide bond, a urethane bond, a urea bond, an ester bond), a hydroxy group, an epoxy group, an isocyanate group, an amino group, a thiol group, an ether bond, etc. From the viewpoint of particularly excellent adhesion of the layer containing a melt-processable fluororesin and another layer when formed into a laminate, preferred are adhesive functional groups selected from the group consisting of carbonyl group-containing groups, hydroxy groups, epoxy groups and isocyanate groups, and particularly preferred are carbonyl group-containing groups.

As the carbonyl group-containing groups, preferred are carbonyl group-containing groups selected from the group consisting of carboxy groups, acid anhydride groups, fluoroformyl groups and carbonate groups.

The content of adhesive functional groups in the adhesive fluororesin is, relative to $1 \times 10^6$ in number of carbon atoms in the main chain of the adhesive fluororesin, preferably from 10 to 60,000 in number, more preferably from 100 to 50,000 in number, more preferably from 100 to 10,000 in number, particularly preferably from 300 to 5,000 in number. When the content of adhesive functional groups is at least the lower limit value in the above range, the adhesion between the layer containing the melt-processable fluororesin and another layer will be particularly excellent when formed into a laminate. When the content of adhesive functional groups is at most the upper limit value in the above range, the adhesion of the layer containing the melt-processable fluororesin and another layer will be attainable at a low processing temperature.

The content of adhesive functional groups can be calculated by a method such as a melt NMR analysis, a fluorine content analysis, an infrared absorption spectrum analysis, etc. For example, as described in JP-A-2007-314720, by using a method such as an infrared absorption spectrum analysis, the proportion (mol %) of units having adhesive functional groups in all units constituting the adhesive fluororesin is obtained, and from such a proportion, the content of the adhesive functional groups can be calculated.

The adhesive fluororesin may be a polymer having units derived from a monomer having an adhesive functional group, a polymer having an adhesive functional group derived from a polymerization initiator or a chain transfer agent at a main chain terminal, or a graft polymer obtained by graft-polymerizing a monomer having an adhesive functional group to a fluororesin.

As the adhesive fluororesin, from the viewpoint of excellency in melt-processability, chemical resistance, mechanical properties, heat resistance, low dielectric constant, low dielectric loss, etc., preferred is a copolymer having units derived from tetrafluoroethylene (hereinafter referred to also as TFE), units derived from a monomer having an adhesive functional group, and units derived from a fluorinated monomer (but excluding TFE), or a copolymer having TFE units and units derived from the fluorinated monomer and having an adhesive functional group at a main chain terminal, and particularly preferred is the former copolymer.

Hereinafter, units derived from TFE will be referred to as "units (u1)", units derived from a monomer having an adhesive functional group will be referred to as "units (u2)", and units derived from a fluorinated monomer other than TFE will be referred to as "units (u3)". Further, a copolymer having units (u1), units (u2) and units (u3) will be referred to as a "copolymer (A1)", and a copolymer having units (u1) and units (u3), and having an adhesive functional group at a main chain terminal will be referred to as a "copolymer (A2)".

As a monomer to constitute a unit (u2), a monomer having a cyclic acid anhydride group is preferred, from the viewpoint of particularly excellent adhesion of a layer containing the copolymer (A1) and another layer when formed into a laminate.

The monomer having a cyclic acid anhydride group may, for example, be itaconic anhydride (hereinafter referred to also as IAH), citraconic anhydride (hereinafter referred to also as CAH), 5-norbornene-2,3-dicarboxylic anhydride (hereinafter referred to also as NAH), maleic anhydride, etc. From such a viewpoint that a copolymer (A1) can be easily produced, a monomer having a cyclic acid anhydride group selected from the group consisting of IAH, CAH and NAH, is preferred, and NAH is particularly preferred from the viewpoint of particularly excellent adhesion of a layer containing the copolymer (A1) and another layer when formed into a laminate.

As the monomer having an adhesive functional group, one type may be used alone, or two or more types may be used in combination.

As a fluorinated monomer to constitute a unit (u3), the following ones may be mentioned.

A fluoroolefin (excluding TFE): vinyl fluoride, vinylidene fluoride (hereinafter referred to also as VDF), trifluoroethylene, chlorotrifluoroethylene, (hereinafter referred to also as CTFE), hexafluoropropylene (hereinafter referred to also as HFP), etc.

$CF_2$=$CFOR^{f1}$ (wherein $R^{f1}$ is a $C_{1-10}$ perfluoroalkyl group, or a group having an etheric oxygen atom between carbon atoms of a $C_{2-10}$ perfluoroalkyl group), $CF_2$=$CFOR^{f2}SO_2X^1$ (wherein $R^{f2}$ is a $C_{1-10}$ perfluoroalkylene group, or a group having an etheric oxygen atom between carbon atoms of a $C_{2-10}$ perfluoroalkylene group, and $X^1$ is a halogen atom or a hydroxy group), $CF_2$=$CFOR^{f3}CO_2X^2$ (wherein $R^{f3}$ is a $C_{1-10}$ perfluoroalkylene group, or a group having an etheric oxygen atom between carbon atoms of a $C_{2-10}$ perfluoroalkylene group, and $X^2$ is a hydrogen atom or a $C_{1-3}$ alkyl group).

$CF_2$=$CF(CF_2)_pOCF$=$CF_2$ (wherein p is 1 or 2), $CH_2$=$CX^3(CF_2)_qX^4$ (wherein $X^3$ is a hydrogen atom or a fluorine atom, q is an integer of from 2 to 10, and $X^4$ is a hydrogen atom or a fluorine atom), perfluoro(2-methylene-4-methyl-1,3-dioxolane), etc.

As the fluorinated monomer, from such a viewpoint that a copolymer (A1) having excellent melt-processability, mechanical characteristics, etc. is obtainable, preferred is a fluorinated monomer selected from the group consisting of VDF, CTFE, HFP, $CF_2$=$CFOR^{f1}$ and $CH_2$=$CX_3(CF_2)_qX_4$, and particularly preferred is $CF_2$=$CFOR^{f1}$ or HFP.

$CF_2$=$CFOR^{f1}$ may, for example, be $CF_2$=$CFOCF_2CF_3$, $CF_2$=$CFOCF_2CF_2CF_3$ (hereinafter referred to also as PPVE), $CF_2$=$CFOCF_2CF_2CF_2CF_3$, $CF_2$=$CFO(CF_2)_8F$, etc., and PPVE is preferred.

$CH_2$=$CX^3(CF_2)_qX^4$ may, for example, be $CH_2$=$CH(CF_2)_2F$, $CH_2$=$CH(CF_2)_3F$, $CH_2$=$CH(CF_2)_4F$, $CH_2$=$CH(CF_2)_6F$, $CH_2$=$CF(CF_2)_3H$, $CH_2$=$CF(CF_2)_4H$, etc., and $CH_2$=$CH(CF_2)_4F$ or $CH_2$=$CH(CF_2)_2F$ is preferred.

As the fluorinated monomer, one type may be used alone, or two or more types may be used in combination.

The proportion of units (u1) is, based on the total of units (u1), units (u2) and units (u3), preferably from 50 to 99.89 mol %, more preferably from 50 to 99.45 mol %, particularly preferably from 50 to 98.95 mol %.

The proportion of units (u2) is, based on the total of units (u1), units (u2) and units (u3), preferably from 0.01 to 5 mol %, more preferably from 0.05 to 3 mol %, particularly preferably from 0.05 to 2 mol %.

The proportion of units (u3) is, based on the total of units (u1), units (u2) and units (u3), preferably from 0.1 to 49.99 mol %, more preferably 0.5 to 49.9 mol %, particularly preferably from 1 to 49.9 mol %.

When the proportions of the respective units are within the above ranges, the copolymer (A1) will be excellent in melt-processability, chemical resistance, mechanical properties (modulus of elasticity at a high temperature, bending resistance, etc.), heat resistance, low dielectric constant, low dielectric loss, etc., and adhesion of a layer containing the copolymer (A1) with another layer will be particularly excellent when formed into a laminate.

The proportions of the respective units can be calculated by the melt NMR analysis, the fluorine content analysis, the infrared absorption spectrum analysis, etc. of the copolymer (A1).

In the copolymer (A1) having units (u2), there may be a case where some of acid anhydride groups are hydrolyzed so that units derived from a dicarboxylic acid (itaconic acid, citraconic acid, 5-norbornene-2,3-dicarboxylic acid, maleic acid, etc.) are contained. In a case where units derived from a dicarboxylic acid are contained, the proportion of such units is regarded to be included in the units (u2).

The copolymer (A1) and the copolymer (A2) may have units (hereinafter referred to as "unit (u4)") derived from a non-fluorinated monomer (but excluding a monomer having an adhesive functional group).

The non-fluorinated monomer may, for example, be an olefin having at most 3 carbon atoms (ethylene, propylene, etc.), a vinyl ester (vinyl acetate, etc.), etc.

As the non-fluorinated monomer, one type may be used alone, or two or more types may be used in combination.

The proportion of units (u4) is, based on the total of units (u1), units (u2) and units (u3), preferably from 5 to 90 mol %, more preferably from 5 to 80 mol %, particularly preferably from 10 to 65 mol %.

Preferred specific examples of the copolymer (A1) may be a TFE/PPVE/NAH copolymer, a TFE/PPVE/IAH copolymer, a TFE/PPVE/CAH copolymer, a TFE/HFP/IAH copolymer, a TFE/HFP/CAH copolymer, a TFE/VDF/IAH copolymer, a TFE/VDF/CAH copolymer, a TFE/$CH_2$=$CH$ $(CF_2)_4F$/IAH/ethylene copolymer, a TFE/$CH_2$=$CH(CF_2)_4$ F/CAH/ethylene copolymer, a TFE/$CH_2$=$CH(CF_2)_2F$/IAH/ ethylene copolymer, a TFE/$CH_2$=$CH(CF_2)_2F$/CAH/ethylene copolymer, etc.

The copolymer (A1) may be produced by the method described in Patent Document 1.

The polymerization method, polymerization conditions, etc., may be the method, conditions, etc. as described in Patent Document 1, and the preferred embodiments are also the same.

The radical polymerization initiator, chain transfer agent, organic solvent, etc. to be used in polymerization of the monomers, may be those described in Patent Document 1, and the preferred embodiments are also the same.

The lower limit value of the melting point of the copolymer (A1) is preferably 260° C., more preferably 280° C., particularly preferably 290° C. The upper limit value is preferably 320° C., particularly preferably 310° C.

(Melt Flow Rate of Fluororesin)

The melt-processable fluororesin is preferably one, of which the melt flow rate at the temperature of the extrusion die and at a load 49N during the production of a fluororesin film is preferably at least 7 g/10 min., or more preferably from 7 to 40 g/10 min., particularly preferably from 10 to 30 g/10 min. When the melt flow rate at the temperature of the extrusion die and at a load of 49N is at least the lower limit value in the above range, the drawability of the molten resin will be sufficient, whereby defects such as ears breakage, etc. are less likely to occur in the film, and further, it is possible to prevent non-uniformity in film thickness of the fluororesin film. When the melt flow rate at the temperature of the extrusion die and at a load of 49N is at most the upper limit value in the above range, thinning by drawing the fluororesin film will be easy, and it has a sufficient melt tension, whereby a film thickness deviation of the fluororesin film can be reduced.

The melt flow rate at 372° C. and at a load 49N of the melt-processable fluororesin, which satisfies the above, is preferably from 20 to 70 g/10 min., more preferably from 20 to 50 g/10 min, particularly preferably from 30 to 50 g/10 min.

The melt-processable fluororesin is preferably one, of which the melt flow rate stability $S_{60}$ obtainable by the following formula (2) is preferably from 0.7 to 1.3, more preferably from 0.7 to 1.0, particularly preferably from 0.8 to 1.0.

$$S_{60} = MFR_{60}/MFR_0 \qquad (2)$$

Here, $MFR_{60}$ is a melt flow rate of the fluororesin at the temperature of the extrusion die and at a load 49N, as measured with respect to the fluororesin after heating for 60 minutes at the temperature of the extrusion die during the production of the fluororesin film in an air atmosphere, and $MFR_0$ is a melt flow rate of the fluororesin at the temperature of the extrusion die and at a load 49N, as measured with respect to the fluororesin before heating for 60 minutes at the temperature of the extrusion die.

In the case of producing the fluororesin film over a long period of time, if the residence time is long, the fluororesin is likely to be crosslinked and gelled, whereby the melt flow rate of the fluorine resin tends to decrease, or if the residence time is long, the fluororesin is likely to be thermally decomposed, whereby the melt flow rate of the fluororesin tends to rise. When the melt flow rate stability $S_{60}$ is at least the lower limit value in the above range, it is possible to produce the fluororesin film stably for a long period of time, while suppressing defects due to deterioration (such as fish eyes due to gelation). When the melt flow rate stability $S_{60}$ is at most the upper limit value in the above range, thinning by drawing of the fluororesin film will be easy, and it has a sufficient melt tension, whereby a thickness deviation of the fluororesin film can be reduced.

(Fluororesin Material)

The fluororesin material comprises a melt-processable fluororesin.

As the melt-processable fluororesin, one type may be used alone, or two or more types may be used in combination.

The fluororesin material may contain a melt-processable non-fluorinated resin and additives, as the case requires, within a range not to impair the effects of the present invention.

The melt-processable non-fluorinated resin may, for example, be an aromatic polyester, a polyamide-imide, a thermoplastic polyimide, etc.

In a case where the fluororesin material contains a melt-processable non-fluorinated resin, the content of the melt-processable non-fluorinated resin is preferably from 0.01 to 20 mass %, particularly preferably from 0.1 to 10 mass %, based on the fluororesin material.

As the additives, inorganic fillers having a low dielectric constant or dielectric loss tangent, are preferred. The inorganic fillers may, for example, be silica, clay, talc, calcium carbonate, mica, diatomaceous earth, alumina, zinc oxide, titanium oxide, calcium oxide, magnesium oxide, iron oxide, tin oxide, antimony oxide, calcium hydroxide, magnesium hydroxide, aluminum hydroxide, basic magnesium carbonate, magnesium carbonate, zinc carbonate, barium carbonate, dawsonite, hydrotalcite, calcium sulfate, barium sulfate, calcium silicate, montmorillonite, bentonite, activated clay, sepiolite, imogolite, sericite, glass fibers, glass beads, silica-type balloons, carbon black, carbon nanotubes, carbon nanohorns, graphite, carbon fibers, glass balloons, carbon burn, wood flour, zinc borate, etc. One type of inorganic fillers may be used alone, or two or more types thereof may be used in combination.

In a case where the fluororesin material contains an inorganic filler, the content of the inorganic filler is preferably from 0.1 to 100 parts by mass, particularly preferably from 0.1 to 60 parts by mass, based on 100 parts by mass of the resin component (Pelletizing)

The fluororesin material is usually pelletized and then used in the film production.

Pelletizing may, for example, be carried out by melt-extruding a fluororesin material into strands by using a biaxial extruder, followed cutting by a pelletizer.

(Apparatus for Producing Fluororesin Film)

The production of a fluororesin film is conducted, for example, by means of a production apparatus as shown in FIG. 1, by melting pellets of the fluororesin material by an extruder 100, supplying the molten resin extruded from the extruder 100 to an extrusion die 102, extruding the molten resin from the extrusion die 102 in a film shape, bringing the film-shaped melt 104 into contact with a pair of cooling rolls 106 for cooling to form a fluororesin film 108.

(Extrusion Die for Filming)

The extrusion die for filming may be one having, in its inside, a manifold for distributing the material across the width direction of the extrusion die. The extrusion die may, for example, be a T-die, a coat hanger type die, a manifold type inflation die, etc.

Figure 2:
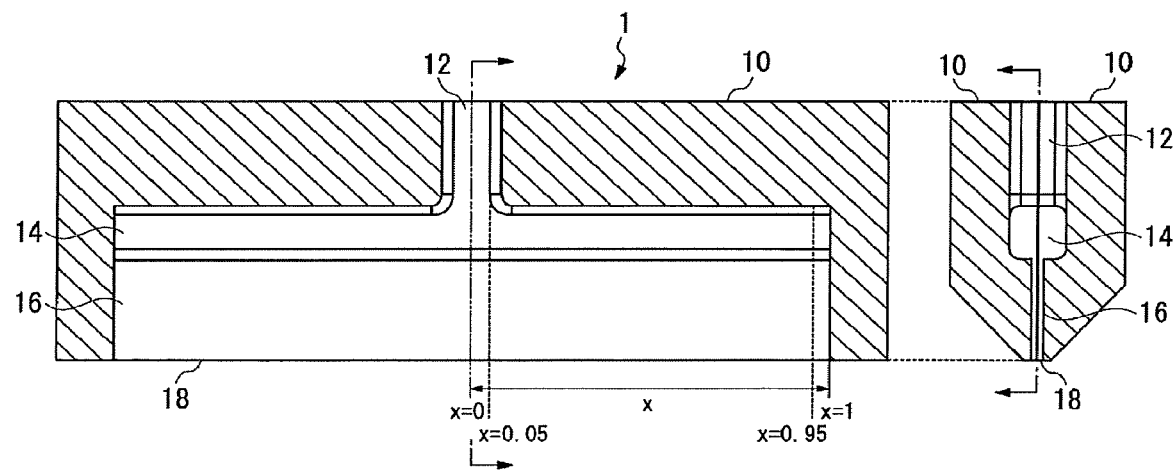
FIG. 2 is a cross-sectional view showing an example of a T-die.

FIG. 2 is a cross-sectional view showing an example of a T-die. The T die 1 is one wherein a pair of die plates 10 with concaves formed to be a flow path of the material are put together and one having a flow path formed inside by the concaves. The internal flow path is constituted by a flow inlet 12 extending from the top center downward, a manifold 14 extending to the left and right from the lower end of the flow inlet 12, a slit-shaped land 16 extending downward from the entire bottom of the manifold 14, and a lip 18 as an opening at the lower end of the land 16.

Figure 3:
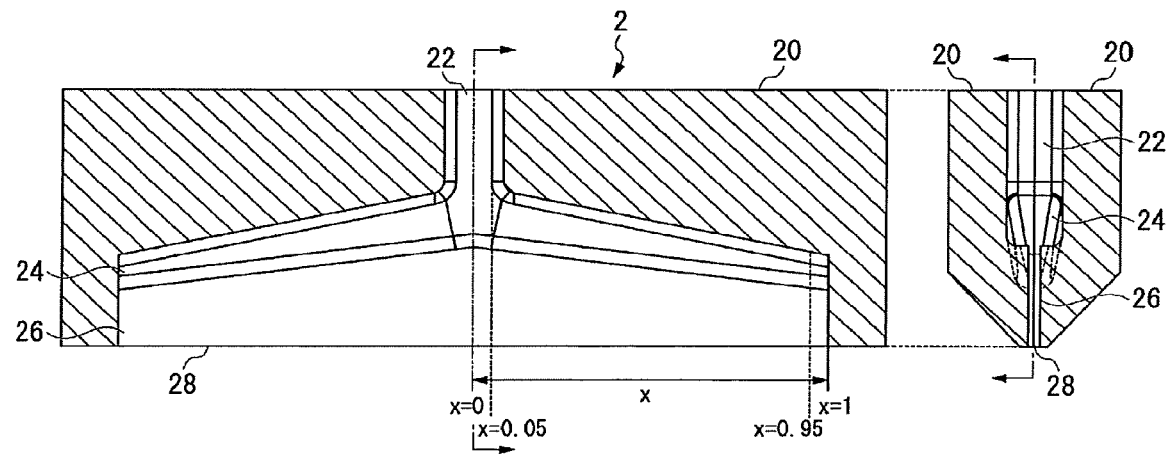
FIG. 3 is a cross-sectional view showing an example of a coat hanger type die.

FIG. 3 is a cross-sectional view showing an example of a coat hanger type die. The coat hanger-type die 2 is one wherein a pair of die plates 20 with concaves formed to be a flow path of the material are put together, and one having a flow path formed inside by the concaves. The internal flow path is constituted by a flow inlet 22 extending from the top center downward, a manifold 24 extending to the left and right from the lower end of the inlet 22, with slight inclination downward while reducing the cross-sectional area as it approaches the end, a slit-shaped land 26 extending downward from the entire bottom of the manifold 24, and a lip 28 as an opening at the lower end of the land 26.

Figure 4:
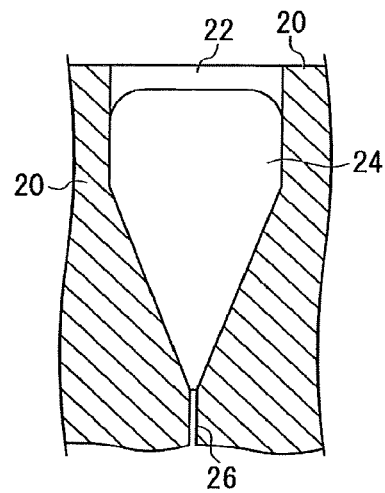
FIG. 4 is a cross-sectional view showing a cross-sectional shape of a paddle-shaped manifold in a coat hanger type die.
Figure 5:
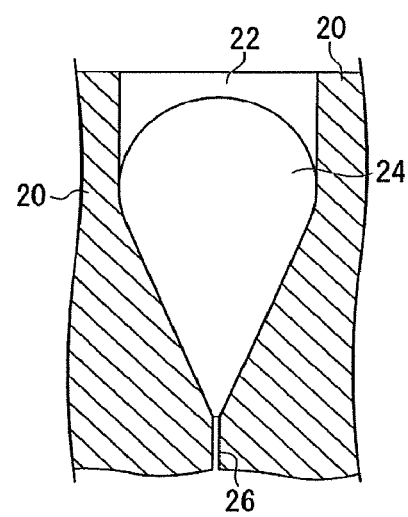
FIG. 5 is a cross-sectional view showing a cross-sectional shape of a teardrop-shaped manifold in a coat hanger type die.

Further, FIG. 4 is a cross-sectional view showing a cross-sectional shape of a paddle-shaped manifold in a coat hanger type die, and FIG. 5 is a cross-sectional view similarly showing a cross-sectional shape of a teardrop-shaped manifold. In either Fig., reference symbols indicate the sites of the same reference symbols as in FIG. 3.

The lip opening in the extrusion die is preferably from 0.5 to 3.0 mm, more preferably from 1.0 to 2.5 mm, particularly preferably from 1.5 to 2.5 mm.

The cross-sectional shape of the manifold in the extrusion die is not particularly limited. The cross-sectional shape of the manifold may, for example, be circular, square as shown in FIGS. 2 and 3, paddle-shaped as shown in FIG. 4, teardrop-shaped as shown in FIG. 5, etc.

(Temperature of Extrusion Die)

The temperature of the extrusion die during the production of a fluororesin film is from 305 to 355° C., preferably from 315 to 340° C., particularly preferably from 320 to 335° C. When the temperature of the extrusion die is at least the lower limit value in the above range, the fluororesin film can stably be melt extruded, and the molding of the fluorine resin material and the production of a fluororesin film are possible. When the temperature of the extrusion die is at most the upper limit value in the above range, defects due to deterioration (such as fish eyes due to gelation) of the melt-processable fluororesin are less likely to occur.

(Flow Rate of Fluororesin Material in Manifold)

The flow rate of the fluororesin material in the manifold of the extrusion die during the production of a fluororesin film, has an effect on the defects (such as fish eyes) of the fluororesin film. That is, in the vicinity of both ends of the manifold, the flow amount of the fluororesin material is reduced, whereby the flow rate of the fluororesin material becomes slow, as compared to the flow rate of the fluororesin material at the flow inlet of the extrusion die. As a result, the fluororesin material in the vicinity of both ends of the manifold tends to stay, and, as described above, the melt flow rate of the fluororesin tends to be low by deterioration (such as gelation) of the fluororesin, or the melt flow rate of the fluororesin tends to rise by thermal decomposition of the fluororesin.

Therefore, during the production of a fluororesin film, the average flow velocity $v_{0.95}$ of the fluororesin material obtainable by the following formula (1) is at least $1 \times 10^{-4}$ m/sec., more preferably at least $2 \times 10^{-4}$ m/sec., particularly preferably at least $3 \times 10^{-4}$ m/sec.

$$v_{0.95} = Q_{0.95}/A_{0.95} \quad (1)$$

Here, as shown in FIGS. 2 and 3, when the distance from the center of the flow inlet of the extrusion die to the end of the manifold of the extrusion die is set to be x=1, $Q_{0.95}$ is the flow rate (m³/sec.) of the fluororesin material flowing in the manifold at a position of x=0.95 from the flow inlet, and $A_{0.95}$ is the cross-sectional area (m²) of the manifold at a position of x=0.95 from the flow inlet.

The manifold is designed to evenly distribute the material across the width direction of the extrusion die, whereby $Q_{0.95}$ can be obtained from the following formula (3).

$$Q_{0.95} = \frac{1}{2} \times Q_0 \times (1-0.95) \quad (3)$$

Here, $Q_0$ is the flow rate (m³/sec.) of the fluororesin material to be supplied to the flow inlet of the extrusion die. $Q_0$ is a value obtained by dividing the extrusion amount (kg/hr) of the extruder by the melt specific gravity (kg/m³) of the fluororesin. The melt specific gravity generally varies depending upon the temperature and the pressure. By measuring its temperature dependence and pressure dependence by using the P-V-T test system manufactured by Toyo Seiki Seisakusho Co., the melt specific gravity can be calculated from the pressure-dependence by extrapolating the melt specific density under atmospheric pressure conditions.

Further, the manifold is designed symmetrically to the left and right in order to evenly distribute the material across the width direction of the extrusion die, whereby the average flow velocity $v_{0.95}$ of the fluororesin material may be obtained at either one side of the manifold branching to the left and right from the flow inlet.

When the average flow velocity $v_{0.95}$ of the fluororesin material is at least the lower limit value in the above range, it is possible to produce a fluororesin film stably for a long period of time, while suppressing defects due to deterioration (such as fish eyes due to gelling) of the melt-processable fluororesin.

The upper limit value of the average flow velocity $v_{0.95}$ of the fluororesin material depends on the viscosity of the material inside the flow path, and due to an extreme increase of the flow rate, the pressure gradient in the extrusion die is likely to increase remarkably, whereby the extrusion die may be deformed, or there may be a phenomenon such that the material generates heat by the flow of the material, and therefore, the upper limit value is preferably $5 \times 10^{-2}$ m/sec., particularly preferably $1 \times 10^{-2}$ m/sec.

Advantageous Effects

In the method for producing a fluororesin film of the present invention as described above, since the temperature of the extrusion die is set to be from 305 to 355° C., it is possible to produce a fluororesin film stably, while suppressing defects due to deterioration (such as fish-eyes due to gelation) of the melt-processable fluororesin. Further, since the above-mentioned average flow velocity $v_{0.95}$ of the fluororesin material is set to be at least $1 \times 10^{-4}$ m/sec., it is possible to produce a fluororesin film stably for a long period of time, while suppressing defects due to deterioration (such as fish-eyes due to gelation) of the melt-processable fluororesin.

EXAMPLES

Now, Examples of the present invention and Comparative Examples will be described. However, the present invention is not limited only to such Examples.

Ex. 1 to 10 are Production Examples, Ex. 11 to 13, 16 to 19, 21 to 23, 25 to 28, 30 to 31 and 33 are Examples of the present invention, and Ex. 14, 15, 20, 24, 29, 32 and 34 are Comparative Examples.

[Evaluation Methods]

(Melting Point)

Using a differential scanning calorimeter (DSC apparatus, manufactured by Seiko Instruments Inc.), the melting peak at the time of heating a fluororesin at a rate of 10° C./min. was recorded, and the temperature (° C.) corresponding to the maximum value was taken as the melting point.

(Melt Specific Gravity)

Using the P-V-T test system manufactured by Toyo Seiki Seisakusho Co., Ltd., the melt specific gravity of each material at from 305° C. to 360° C. under atmospheric pressure, was obtained, and the average value was obtained and found to be 1,500 kg/m³.

(Melt Flow Rate)

Using a melt indexer (manufactured by Techno Seven Co., Ltd.), the mass (g) of a fluororesin flowing out for 10 minutes from a nozzle with a diameter of 2 mm and a length of 8 mm at a predetermined temperature and under a condition of a load of 49N, was measured.

(Melt Flow Rate Stability)

After sampling a part of pellets of a fluorine resin, the melt flow rate $MFR_0$ of the fluorine resin at the temperature of the extrusion die and at a load of 49N during the production of a fluororesin film, was measured. Further, after sampling a part of pellets of a fluorine resin, and after heating for 60 minutes at the temperature of the extrusion die during the production of a fluororesin film in an oven with an air atmosphere, the melt flow rate $MFR_{60}$ of the fluororesin at the temperature of the extrusion die and at a load of 49N during the production of a fluororesin film, was measured. The melt flow rate stability $S_{60}$ was obtained from the following formula (2).

$$S_{60} = MFR_{60}/MFR_0 \quad (2)$$

(Thickness of Fluororesin Film)

The thickness of a fluororesin film was measured by using a high-precision Digimatic Micrometer MDH-25M (manufactured by Mitutoyo Corporation).

(Fish-Eyes)

With respect to fish-eyes in a fluororesin film, the fluorine resin film was visually observed, and regarding the initiation for production of the fluororesin film as 0 hour, the time when fish-eyes were confirmed, was recorded.

(Ears Breakage)

During the production of a fluororesin film, while extruding the film, the deformation behavior of the film edges after extruded from the extrusion die was visually observed. A case where, in the steady state, there is no substantial change in the shape of the film edges, and the width of the fluororesin film to be formed is also in a stable state, i.e. the case showing so-called stable necking, was evaluated as "no ears breakage". On the other hand, a case where, in the steady state, a periodical deformation behavior such as being elongated or broken is observed at the time when the film edges are stretched, was evaluated as "ears breakage observed".

(Thickness Precision)

The thickness precision of a fluororesin film was obtained from the following formula (4).

Thickness precision (%)=(maximum thickness of fluororesin film−minimum thickness of fluororesin film)/average thickness of the fluororesin×100    (4)

Ex. 1

After evacuating a stainless steel polymerization vessel having an inner volume of 94 L and equipped with a stirrer and a jacket, 86.8 kg (56 L) of a 1,3-dichloro-1,1,2,2,3-pentafluoropropane (manufactured by Asahi Glass Company, Limited, AK225cb) (hereinafter referred to also as AK225cb.) solution containing 0.107 mass % of methanol and 9.1 mass % of PPVE, was charged, and while stirring inside of the polymerization vessel, the inside temperature of the vessel was made to be 50° C. Then, TFE gas was charged until the internal pressure of the polymerization vessel became 0.89 MPa (gauge pressure), and after the internal temperature became stable, an AK225cb solution containing 0.4 mass % of bis(perfluorobutyryl) peroxide was added at a rate of 3 mL/min. (4.65 g/min.) to initiate the polymerization. During the polymerization, TFE gas was added so that the internal pressure became constant at 0.89 MPa (gauge pressure). Further, in order to maintain the rate of consumption of TFE gas to be 0.8 kg/hr, the addition rate of the 0.4 mass % AK225cb solution of bis(perfluorobutyryl) peroxide was adjusted. In addition, a 0.73 mass % AK225cb solution of NAH (manufactured by Hitachi Chemical Co., Ltd., himic anhydride) was added continuously at a ratio of 0.16 mol % relative to TFE gas added during the polymerization. At the time when 7.7 kg of TFE gas was added from the initiation of the reaction, the polymerization vessel was cooled and the residual gas was purged to terminate the polymerization.

The slurry obtained by the polymerization was heated with stirring in the presence of water, to separate the solvent and residual monomers from the copolymer, and to granulate the copolymer into granules to obtain 7.9 kg of copolymer (A1-1).

The specific gravity of the copolymer (A1-1) was 2.15. The composition of the copolymer (A1-1), was TFE units/PPVE units/NAH units=97.9/2.0/0.1 (mol %). The melting point of the copolymer (A1-1) was 300° C., the melt flow rate at a temperature of 372° C. and at a load of 49N was 20.9 g/10 min. The content of adhesive functional groups (acid anhydride groups) in the copolymer (A1-1) was 1,000 based on the number of $1\times10^6$ carbon atoms in the main chain of the copolymer (A1-1).

Ex. 2

The polymerization was conducted in the same manner as in Ex. 1 except that the concentration of methanol in the AK225cb solution charged to the polymerization vessel was changed to 0.145 mass %, to obtain a 7.9 kg of copolymer (A1-2).

The specific gravity of the copolymer (A1-2) was 2.15. The composition of the copolymer (A1-2) was TFE units/PPVE units/NAH units=97.9/2.0/0.1 (mol %). The melting point of the copolymer (A1-2) was 300° C., and the melt flow rate at a temperature of 372° C. and at a load of 49N was 39.7 g/10 min.

Ex. 3

The polymerization was conducted in the same manner as in Ex. 1 except that the concentration of methanol in the AK225cb solution charged to the polymerization vessel was changed to 0.174 mass %, to obtain 7.9 kg of copolymer (A1-3).

The specific gravity of the copolymer (A1-3) was 2.15. The composition of the copolymer (A1-3) was TFE units/PPVE units/NAH units=97.9/2.0/0.1 (mol %). The melting point of the copolymer (A1-3) was 300° C., and the melt flow rate at a temperature 372° C. and at a load of 49N, was 57.8 g/10 min.

Ex. 4

The polymerization was conducted in the same manner as in Ex. 1 except that the concentration of methanol in the AK225cb solution charged to the polymerization vessel was changed to 0.197 mass %, to obtain 7.9 kg of copolymer (A1-4).

The specific gravity of the copolymer (A1-4) was 2.15. The composition of the copolymer (A1-4) was TFE units/PPVE units/NAH units=97.9/2.0/0.1 (mol %). The melting point of the copolymer (A1-4) was 300° C., and the melt flow rate at a temperature of 372° C. and at a load of 49N, was 80.8 g/10 min.

Ex. 5

A polymerization initiator solution having (perfluorobutyryl) peroxide dissolved at a concentration of 0.36 mass % in AK225cb, was prepared.

A NAH solution having NAH dissolved at a concentration of 0.3 mass % in AK225cb, was prepared.

369 kg of AK225cb and 30 kg of PPVE (manufactured by Asahi Glass Company, Limited) were charged into a polymerization vessel having an internal volume of 430 L, which was preliminarily evacuated. Inside of the polymerization vessel was heated to 50° C., 50 kg of TFE gas was charged, and then, the pressure in the polymerization vessel was raised to 0.89 MPa (gauge pressure). Polymerization was carried out while adding 3 L of the polymerization initiator solution into the polymerization vessel continuously at a rate of 6.25 mL per minute. Further, TFE gas was continuously charged so that the pressure in the polymerization vessel was maintained to be 0.89 MPa (gauge pressure) during the polymerization reaction. Further, the NAH solution was charged continuously in an amount corresponding to 0.1 mol % relative to the number of moles of TFE to be charged during the polymerization.

After 8 hours from the initiation of the polymerization, when 32 kg of TFE gas was charged, the temperature in the polymerization vessel was lowered to room temperature, and the pressure was purged to normal pressure. The obtained slurry was solid-liquid separated from AK225cb, followed by drying for 15 hours at 150° C., to obtain 33 kg of a granulated product of copolymer (A1-5).

The specific gravity of the copolymer (A1-5) was 2.15. The composition of the copolymer (A1-5) was TFE units/PPVE units/NAH units=97.9/2.0/0.1 (mol %). The melting point of the copolymer (A1-5) was 300° C., and the melt flow rate at a temperature of 372° C. and at a load of 49N, was 11.9 g/10 min.

Ex. 6

Using a twin screw extruder provided with a vent mechanism (manufactured by Toshiba Machine Co., Ltd.) and maintaining 0.1 atm by evacuating the vent, the copolymer (A1-1) obtained in Ex. 1, was extruded into strands at a temperature of 320° C., at a discharge rate of 5 kg/hr, at a rotational speed of 200 rpm (revolutions per minute) and then cut by a pelletizer to obtain pellets of the copolymer (A1-1).

Ex. 7 to 10

Pellets of the copolymer (A1-2) to (A1-5) were obtained in the same manner as in Ex. 6, except that the copolymer (A1-1) was changed to the copolymers (A1-2) to (A1-5).

Ex. 11

As the extruder, a ϕ90 mm extruder manufactured by SML Co., was prepared. As the extrusion die, a coat hanger type die having a width of 1.6 m (hereinafter referred to also as an extrusion die (I)) wherein the cross-sectional shape of the manifold was a paddle shape as shown in FIG. 4, was prepared.

The pellets of the copolymer (A1-1) were supplied to the extruder, the copolymer (A1-1) was melt-extruded from the extruder at a temperature of 320° C., at a discharge rate of 50 kg/hr (line speed: 10 m/min.), and the molten resin was supplied directly to the extrusion die (I), and the molten resin was discharged in a film form from the extrusion die (I). At that time, the temperature of the extrusion die (I) was 325° C., and the lip opening of the extrusion die (I) was 0.8 mm. The film form melt discharged from the extrusion die (I) was stretched immediately after being discharged, and contacted and cooled with the cooling rolls, to form a fluororesin film. At that time, the air gap (the distance from discharge from the extrusion die (I) to the contact with the cooling rolls) was 100 mm. By adjusting the take-off speed of the fluororesin film, fluororesin films having a thickness of 100 μm, 25 μm and 12 μm were obtained.

Ex. 12 to 16

Fluororesin films in Ex. 12 to 16 were obtained in the same manner as in Ex. 11, except that the extrusion die temperature was changed as shown in Tables 1 and 2.

In Ex. 11 to 16, the melt flow rate $MFR_0$ and the melt flow rate stability $S_{60}$ of the fluororesin at the temperature of the extrusion die and at a load of 49N, the flow rate $Q_0$ of the fluororesin material to be supplied to the flow inlet of the extrusion die and the flow rate $Q_{0.05}$ of the fluororesin material flowing in the manifold at a position of x=0.05 from the flow inlet, the cross-sectional area A0.05 of the manifold and the average flow velocity $v_{0.05}$ of the fluororesin material as well as the flow rate $Q_{0.95}$ of the fluororesin material flowing in the manifold at a position of x=0.95 from the flow inlet, the cross-sectional area A0.95 of the manifold and the average flow velocity $v_{0.95}$ of the fluororesin material as well as the evaluation results of the obtained fluororesin films, are shown in Tables 1 and 2.

Further, the average flow velocity $v_{0.05}$ can be obtained from the following formula (5), and the flow rate $Q_{0.05}$ can be obtained from the following formula (6).

$$v_{0.05} = Q_{0.05}/A_{0.05} \tag{5}$$

$$Q_{0.05} = \frac{1}{2} \times Q_0 \times (1-0.05) \tag{6}$$

TABLE 1

|  |  |  | Ex. 11 | Ex. 12 | Ex. 13 | Ex. 14 | Ex. 15 |
|---|---|---|---|---|---|---|---|
| Fluororesin | Type | — | (A1-1) | (A1-1) | (A1-1) | (A1-1) | (A1-1) |
|  | MFR (372° C.) | g/10 min | 20.9 | 20.9 | 20.9 | 20.9 | 20.9 |
|  | Melting point | ° C. | 300 | 300 | 300 | 300 | 300 |
|  | Extrusion die temperature | ° C. | 325 | 335 | 355 | 360 | 300 |
|  | $MFR_0$ | g/10 min | 9.0 | 10.7 | 15.8 | 17.0 | 0 |
|  | $S_{60}$ | — | 0.904 | 0.830 | 0.700 | 0.683 | 1.000 |
| Extruder | Extruded amount | kg/hr | 50 | 50 | 50 | 50 | Not extrudable |
| Extrusion die | Type | — | (I) | (I) | (I) | (I) | (I) |
|  | $Q_0$ | m³/sec. | 9.26 × 10⁻⁶ | 9.26 × 10⁻⁶ | 9.26 × 10⁻⁶ | 9.26 × 10⁻⁶ | Not extrudable |
|  | $Q_{0.05}$ | m³/sec. | 4.40 × 10⁻⁶ | 4.40 × 10⁻⁶ | 4.40 × 10⁻⁶ | 4.40 × 10⁻⁶ |  |
|  | $Q_{0.95}$ | m³/sec. | 2.31 × 10⁻⁷ | 2.31 × 10⁻⁷ | 2.31 × 10⁻⁷ | 2.31 × 10⁻⁷ |  |
|  | $A_{0.05}$ | m² | 6.29 × 10⁻⁴ | 6.29 × 10⁻⁴ | 6.29 × 10⁻⁴ | 6.29 × 10⁻⁴ |  |
|  | $A_{0.95}$ | m² | 3.52 × 10⁻⁴ | 3.52 × 10⁻⁴ | 3.52 × 10⁻⁴ | 3.52 × 10⁻⁴ |  |
|  | $v_{0.05}$ | m/sec. | 6.99 × 10⁻³ | 6.99 × 10⁻³ | 6.99 × 10⁻³ | 6.99 × 10⁻³ |  |
|  | $v_{0.95}$ | m/sec. | 6.58 × 10⁻⁴ | 6.58 × 10⁻⁴ | 6.58 × 10⁻⁴ | 6.58 × 10⁻⁴ |  |
|  | Width | m | 1.6 | 1.6 | 1.6 | 1.6 | 1.6 |
| Results | Thickness | μm | 100  25  12 | 100  25  12 | 100  25  12 | 100  25  12 | 100  25  12 |
|  | Fish-eyes | — | No  No  No | No  No  No | No  No  No | Formed after 3 hours  No  No | X  X  X |
|  | Ears breakage | — | No  No  No | No  No  No | No  No  No | No  No  No | X  X  X |

TABLE 1-continued

|  |  | Ex. 11 | | | Ex. 12 | | | Ex. 13 | | | Ex. 14 | | | Ex. 15 | | |
| --- | --- | --- | --- | --- | --- | --- | --- | --- | --- | --- | --- | --- | --- | --- | --- | --- |
| Thickness precision | % | 3.5 | 3.9 | 4.0 | 3.0 | 3.2 | 3.4 | 4.4 | 4.8 | 5.5 | 9.5 | 9.6 | 15.0 | X | X | X |

X: Not moldable

In Ex. 11 to 13 wherein the temperature of the extrusion die was from 305 to 355° C., and the average flow velocity $v_{0.95}$ was at least $1 \times 10^{-4}$ m/sec., no fish eyes in the fluororesin film were observed. In Ex. 15 wherein the temperature of the extrusion die was 300° C., the melt flow rate of the copolymer (A1-1) at the temperature of the extrusion die and at a load of 49N was 0 g/10 min., whereby the fluorine resin material did not flow in the extruder, and It was not possible to conduct extrusion molding.

In Ex. 14 wherein the temperature of the extrusion die exceeded 355° C., fish eyes were observed in the fluororesin film.

Ex. 17, 18 and 20

Fluorine resin films in Ex. 17, 18 and 20 were obtained in the same manner as in Ex. 12, except that the copolymer (A1-1) was changed to the copolymers (A1-2) to (A1-4), respectively.

Ex. 19

A fluororesin film in Ex. 19 was obtained in the same manner as Ex. 18, except that the extrusion die temperature was changed as shown in Table 2.

$MFR_0$, $S_{60}$, $Q_0$, $Q_{0.05}$, $A_{0.05}$, $v_{0.05}$, $Q_{0.95}$, $A_{0.95}$, $v_{0.95}$, and the evaluation results of the obtained fluororesin films are shown in Table 2.

In Ex. 16 to 19 wherein the temperature of the extrusion die was from 305 to 355° C., and the average flow velocity $v_{0.95}$ was at least $1 \times 10^{-4}$ m/sec., no fish eyes were observed in the fluororesin film. In Ex. 20 wherein the melt flow rate stability $S_{60}$ of the copolymer (A1-5) was less than 0.7, fish eyes were observed in the fluororesin film when produced for a long period of time.

Ex. 21 to 25

Fluororesin films in Ex. 21 to 25 were obtained in the same manner as in Ex. 12, except that the discharge amount of the copolymer (A1-1) from the extruder was changed as shown in Table 3. In Ex. 21, 22 and 25, the lip opening was set to be 1.8 mm.

$MFR_0$, $S_{60}$, $Q_0$, $Q_{0.05}$, $A_{0.05}$, $v_{0.05}$, $Q_{0.95}$, $A_{0.95}$, $v_{0.95}$, and the evaluation results of the obtained fluororesin films, are shown in Table 3.

TABLE 2

|  |  |  | Ex. 16 | | | Ex. 17 | | | Ex. 18 | | | Ex. 19 | | | Ex. 20 | | |
| --- | --- | --- | --- | --- | --- | --- | --- | --- | --- | --- | --- | --- | --- | --- | --- | --- | --- |
| Fluororesin | Type | — | (A1-1) | | | (A1-2) | | | (A1-3) | | | (A1-3) | | | (A1-4) | | |
|  | MFR (372° C.) | g/10 min | 20.9 | | | 39.7 | | | 57.8 | | | 57.8 | | | 80.8 | | |
|  | Melting point | ° C. | 300 | | | 300 | | | 300 | | | 300 | | | 300 | | |
|  | Extrusion die temperature | ° C. | 335 | | | 335 | | | 355 | | | 305 | | | 335 | | |
|  | $MFR_0$ | g/10 min | 10.7 | | | 20.4 | | | 29.6 | | | 16.5 | | | 441.4 | | |
|  | $S_{60}$ | — | 0.900 | | | 0.850 | | | 0.780 | | | 0.990 | | | 0.650 | | |
| Extruder | Extruded amount | kg/hr | 50 | | | 50 | | | 50 | | | 50 | | | 50 | | |
| Extrusion die | Type | — | (I) | | | (I) | | | (I) | | | (I) | | | (I) | | |
|  | $Q_0$ | m³/sec. | $9.26 \times 10^{-6}$ | | | $9.26 \times 10^{-6}$ | | | $9.26 \times 10^{-6}$ | | | $9.26 \times 10^{-6}$ | | | Not extrudable | | |
|  | $Q_{0.05}$ | m³/sec. | $4.40 \times 10^{-6}$ | | | $4.40 \times 10^{-6}$ | | | $4.40 \times 10^{-6}$ | | | $4.40 \times 10^{-6}$ | | |  | | |
|  | $Q_{0.95}$ | m³/sec. | $2.31 \times 10^{-7}$ | | | $2.31 \times 10^{-7}$ | | | $2.31 \times 10^{-7}$ | | | $2.31 \times 10^{-7}$ | | |  | | |
|  | $A_{0.05}$ | m² | $6.29 \times 10^{-4}$ | | | $6.29 \times 10^{-4}$ | | | $6.29 \times 10^{-4}$ | | | $6.29 \times 10^{-4}$ | | |  | | |
|  | $A_{0.95}$ | m² | $3.52 \times 10^{-4}$ | | | $3.52 \times 10^{-4}$ | | | $3.52 \times 10^{-4}$ | | | $3.52 \times 10^{-4}$ | | |  | | |
|  | $v_{0.05}$ | m/sec. | $6.99 \times 10^{-3}$ | | | $6.99 \times 10^{-3}$ | | | $6.99 \times 10^{-3}$ | | | $6.99 \times 10^{-3}$ | | |  | | |
|  | $v_{0.95}$ | m/sec. | $6.58 \times 10^{-4}$ | | | $6.58 \times 10^{-4}$ | | | $6.58 \times 10^{-4}$ | | | $6.58 \times 10^{-4}$ | | |  | | |
|  | Width | m | 1.6 | | | 1.6 | | | 1.6 | | | 1.6 | | | 1.6 | | |
| Results | Thickness | μm | 100 | 25 | 12 | 100 | 25 | 12 | 100 | 25 | 12 | 100 | 25 | 12 | 100 | 25 | 12 |
|  | Fish-eyes | — | No | No | No | No | No | No | No | No | No | No | No | No | Formed after 6 hours | | |
|  | Ears breakage | — | No | No | No | No | No | No | No | No | No | No | No | No | No | No | No |
|  | Thickness precision | % | 3.4 | 3.7 | 3.6 | 2.9 | 3.1 | 3.4 | 2.9 | 2.9 | 2.9 | 3.1 | 2.9 | 3.4 | 9.5 | 9.6 | 15.0 |

TABLE 3

|  |  |  | Ex. 21 | Ex. 22 | | | Ex. 23 | | | Ex. 24 | | | Ex. 25 | | |
|---|---|---|---|---|---|---|---|---|---|---|---|---|---|---|---|
| Fluororesin | Type | — | (A1-1) | (A1-1) | | | (A1-1) | | | (A1-1) | | | (A1-1) | | |
|  | MFR (372° C.) | g/10 min | 20.9 | 20.9 | | | 20.9 | | | 20.9 | | | 20.9 | | |
|  | Melting point | ° C. | 300 | 300 | | | 300 | | | 300 | | | 300 | | |
|  | Extrusion die temperature | ° C. | 335 | 335 | | | 335 | | | 335 | | | 335 | | |
|  | $MFR_0$ | g/10 min | 10.7 | 10.7 | | | 10.7 | | | 10.7 | | | 10.7 | | |
|  | $S_{60}$ | — | 0.830 | 0.830 | | | 0.830 | | | 0.830 | | | 0.830 | | |
| Extruder | Extruded amount | kg/hr | 100 | 250 | | | 25 | | | 5 | | | 300 | | |
| Extrusion die | Type | — | (I) | (I) | | | (I) | | | (I) | | | (I) | | |
|  | $Q_0$ | m³/sec. | $1.85 \times 10^{-5}$ | $4.63 \times 10^{-5}$ | | | $4.63 \times 10^{-6}$ | | | $9.26 \times 10^{-7}$ | | | $5.56 \times 10^{-5}$ | | |
|  | $Q_{0.05}$ | m³/sec. | $8.80 \times 10^{-6}$ | $2.20 \times 10^{-5}$ | | | $2.20 \times 10^{-6}$ | | | $4.40 \times 10^{-7}$ | | | $2.64 \times 10^{-5}$ | | |
|  | $Q_{0.95}$ | m³/sec. | $4.63 \times 10^{-7}$ | $1.16 \times 10^{-6}$ | | | $1.16 \times 10^{-7}$ | | | $2.31 \times 10^{-8}$ | | | $1.39 \times 10^{-6}$ | | |
|  | $A_{0.05}$ | m² | $6.29 \times 10^{-4}$ | $6.29 \times 10^{-4}$ | | | $6.29 \times 10^{-4}$ | | | $6.29 \times 10^{-4}$ | | | $6.29 \times 10^{-4}$ | | |
|  | $A_{0.95}$ | m² | $3.52 \times 10^{-4}$ | $3.52 \times 10^{-4}$ | | | $3.52 \times 10^{-4}$ | | | $3.52 \times 10^{-4}$ | | | $3.52 \times 10^{-4}$ | | |
|  | $v_{0.05}$ | m/sec. | $1.40 \times 10^{-2}$ | $3.50 \times 10^{-2}$ | | | $3.50 \times 10^{-3}$ | | | $6.99 \times 10^{-4}$ | | | $4.20 \times 10^{-2}$ | | |
|  | $v_{0.95}$ | m/sec. | $1.32 \times 10^{-3}$ | $3.29 \times 10^{-3}$ | | | $3.29 \times 10^{-4}$ | | | $6.58 \times 10^{-5}$ | | | $3.95 \times 10^{-3}$ | | |
|  | Width | m | 1.6 | 1.6 | | | 1.6 | | | 1.6 | | | 1.6 | | |
| Results | Thickness | μm | 100 | 25 | 12 | 100 | 25 | 12 | 100 | 25 | 12 | 100 | 25 | 12 |
|  | | | | | | | | | | | | | | | |
|  | Thickness | μm | 100 | 25 | 12 | 100 | 25 | 12 | 100 | 25 | 12 | 100 | 25 | 12 |
|  | Fish-eyes | — | No | No No | | No | No No | | No | No No | | Formed after 4 hours | No | No |
|  | Ears breakage | — | No | No No | | No | No No | | No | No No | | No No | Observed | No No |
|  | Thickness precision | % | 3.1 | 3.2 | 3.0 | 4.0 | 3.9 | 4.3 | 2.9 | 3.0 | 3.4 | 4.5 | 4.6 | 12.6 | 8.0 | 8.5 | 9.0 |

In Ex. 21 to 23 and 25 wherein the temperature of the extrusion die was from 305 to 335° C., and the average flow velocity $v_{0.95}$ was at least $1 \times 10^{-4}$ m/sec., no fish eyes were observed in the fluororesin film. In Ex. 25, the average flow velocity $v_{0.05}$ was too high, whereby the extrusion die was deformed, film thickness control became difficult, and the thickness precision was inferior.

On the other hand, in Ex. 24 wherein the average flow velocity $v_{0.95}$ was less than $1 \times 10^{-4}$ m/sec., fish eyes were observed in the fluororesin film after 4 hours from the initiation of the production. Further, since the melt flow rate of the fluororesin was lowered as the time passed, in the case of Ex. 24 wherein the average flow rate was low, the fluororesin material became thickened during flowing inside of the extrusion die, and the melt-drawability was impaired by the synergistic effect with an increase of non-uniformity due to formation of fish eyes. As a result, continuous and steady melt-drawing of the fluororesin film became impossible at "ears" being film edges where the stretched deformation becomes largest during the film molding, whereby ears breakage occurred. Furthermore, since stretching of film edges was not stable, the whole fluororesin film was vibrated, whereby the thickness precision was lowered.

Ex. 26 to 29

Fluororesin films in Ex. 26 to 29 were obtained in the same manner as in Ex. 12, except that the extrusion die (I) was changed to the extrusion dies (II) to (V), respectively.

The extrusion dies (II) to (V) are coat hanger type dies, wherein the cross-sectional shape of the manifold is teardrop-shaped as shown in FIG. 5, the width is 1.6 m, and the cross-sectional areas $A_{0.05}$ and $A_{0.95}$ of the manifold have values as shown in Table 4.

$MFR_0$, $S_{60}$, $Q_0$, $Q_{0.05}$, $A_{0.05}$, $v_{0.05}$, $Q_{0.95}$, $A_{0.95}$, $v_{0.95}$, and the evaluation results of the obtained fluororesin films are shown in Table 4.

TABLE 4

|  |  |  | Ex. 26 | Ex. 27 | | | Ex. 28 | | | Ex. 29 | | |
|---|---|---|---|---|---|---|---|---|---|---|---|---|
| Fluororesin | Type | — | (A1-1) | (A1-1) | | | (A1-1) | | | (A1-1) | | |
|  | MFR (372° C.) | g/10 min | 20.9 | 20.9 | | | 20.9 | | | 20.9 | | |
|  | Melting point | ° C. | 300 | 300 | | | 300 | | | 300 | | |
|  | Extrusion die temperature | ° C. | 335 | 335 | | | 335 | | | 335 | | |
|  | $MFR_0$ | g/10 min | 10.7 | 10.7 | | | 10.7 | | | 10.7 | | |
|  | $S_{60}$ | — | 0.830 | 0.830 | | | 0.830 | | | 0.830 | | |
| Extruder | Extruded amount | kg/hr | 50 | 50 | | | 50 | | | 50 | | |
| Extrusion die | Type | — | (II) | (III) | | | (IV) | | | (V) | | |
|  | $Q_0$ | m³/sec. | $9.26 \times 10^{-6}$ | $9.26 \times 10^{-6}$ | | | $9.26 \times 10^{-6}$ | | | $9.26 \times 10^{-6}$ | | |
|  | $Q_{0.05}$ | m³/sec. | $4.40 \times 10^{-6}$ | $4.40 \times 10^{-6}$ | | | $4.40 \times 10^{-6}$ | | | $4.40 \times 10^{-6}$ | | |
|  | $Q_{0.95}$ | m³/sec. | $2.31 \times 10^{-7}$ | $2.31 \times 10^{-7}$ | | | $2.31 \times 10^{-7}$ | | | $2.31 \times 10^{-7}$ | | |
|  | $A_{0.05}$ | m² | $3.81 \times 10^{-4}$ | $5.85 \times 10^{-4}$ | | | $1.76 \times 10^{-3}$ | | | $2.63 \times 10^{-3}$ | | |
|  | $A_{0.95}$ | m² | $3.81 \times 10^{-4}$ | $5.85 \times 10^{-4}$ | | | $1.76 \times 10^{-3}$ | | | $2.63 \times 10^{-3}$ | | |
|  | $v_{0.05}$ | m/sec. | $1.15 \times 10^{-2}$ | $7.52 \times 10^{-3}$ | | | $2.51 \times 10^{-3}$ | | | $1.67 \times 10^{-3}$ | | |
|  | $v_{0.95}$ | m/sec. | $6.08 \times 10^{-4}$ | $3.96 \times 10^{-4}$ | | | $1.32 \times 10^{-4}$ | | | $8.79 \times 10^{-5}$ | | |
|  | Width | m | 1.6 | 1.6 | | | 1.6 | | | 1.6 | | |
| Results | Thickness | μm | 100 | 25 | 12 | 100 | 25 | 12 | 100 | 25 | 12 | 100 | 25 | 12 |
|  | Fish-eyes | — | No | No | No | No | No | No | No | No | No | Formed after 3 hours | | |

TABLE 4-continued

|  |  | Ex. 26 | | | Ex. 27 | | | Ex. 28 | | | Ex. 29 | | |
| --- | --- | --- | --- | --- | --- | --- | --- | --- | --- | --- | --- | --- | --- |
| Ears breakage | — | No | No | No | No | No | No | No | No | No | No | No | observed |
| Thickness precision | % | 3.1 | 3.2 | 3.0 | 4.0 | 3.9 | 4.3 | 2.9 | 3.2 | 3.0 | 5.0 | 5.2 | 15.9 |

In Ex. 26 to 28 wherein the temperature of the extrusion die was from 305 to 335° C., and the average flow velocity $v_{0.95}$ was at least $1 \times 10^{-4}$ m/sec., no fish eyes were observed in the fluororesin film.

In Ex. 29 wherein the average flow velocity $v_{0.95}$ was less than $1 \times 10^{-4}$ m/sec., the flow rate of the fluororesin material inside the extrusion die was significantly slower, whereby retention of the fluororesin material occurred, and fish eyes were formed in a large amount. Moreover, because of the fish-eyes, the thickness precision was significantly decreased.

Ex. 30 to 32

Fluororesin films in Ex. 30 to 32 were obtained in the same manner as in Ex. 11, except that the copolymer (A1-1) was changed to the copolymer (A1-5), and the temperature of the extrusion die was changed as shown in Table 5.

TABLE 5

|  |  |  | Ex. 30 | | | Ex. 31 | | | Ex. 32 | | |
| --- | --- | --- | --- | --- | --- | --- | --- | --- | --- | --- | --- |
| Fluororesin | Type | — | (A1-5) | | | (A1-5) | | | (A1-5) | | |
|  | MFR (372° C.) | g/10 min | 11.9 | | | 11.9 | | | 11.9 | | |
|  | Melting point | ° C. | 300 | | | 300 | | | 300 | | |
|  | Extrusion die temperature | ° C. | 310 | | | 335 | | | 360 | | |
|  | MFR$_0$ | g/10 min | 4.0 | | | 6.1 | | | 9.7 | | |
|  | S$_{60}$ | — | 0.980 | | | 0.830 | | | 0.630 | | |
| Extruder | Extruded amount | kg/hr | 50 | | | 50 | | | 50 | | |
| Extrusion die | Type | — | (I) | | | (I) | | | (I) | | |
|  | Q$_0$ | m³/sec. | 9.26 × 10$^{-6}$ | | | 9.26 × 10$^{-6}$ | | | 9.26 × 10$^{-6}$ | | |
|  | Q$_{0.05}$ | m³/sec. | 4.40 × 10$^{-6}$ | | | 4.40 × 10$^{-6}$ | | | 4.40 × 10$^{-6}$ | | |
|  | Q$_{0.95}$ | m³/sec. | 2.31 × 10$^{-7}$ | | | 2.31 × 10$^{-7}$ | | | 2.31 × 10$^{-7}$ | | |
|  | A$_{0.05}$ | m² | 6.29 × 10$^{-4}$ | | | 6.29 × 10$^{-4}$ | | | 6.29 × 10$^{-4}$ | | |
|  | A$_{0.95}$ | m² | 3.52 × 10$^{-4}$ | | | 3.52 × 10$^{-4}$ | | | 3.52 × 10$^{-4}$ | | |
|  | v$_{0.05}$ | m/sec. | 6.99 × 10$^{-3}$ | | | 6.99 × 10$^{-3}$ | | | 6.99 × 10$^{-3}$ | | |
|  | v$_{0.95}$ | m/sec. | 6.58 × 10$^{-4}$ | | | 6.58 × 10$^{-4}$ | | | 6.58 × 10$^{-4}$ | | |
|  | Width | m | 1.6 | | | 1.6 | | | 1.6 | | |
| Results | Thickness | μm | 100 | 25 | 12 | 100 | 25 | 12 | 100 | 25 | 12 |
|  | Fish-eyes | — | No observed | X | X | No observed | X | X | Formed after 3 hours | No | No observed |
|  | Ears breakage | — |  |  |  |  |  |  |  |  |  |
|  | Thickness precision | % | 23.8 | X | X | 19.4 | X | X | 5.2 | 5.2 | 17.9 |

X: Not moldable

In Ex. 30 and 31 wherein the temperature of the extrusion die was from 305 to 335° C., and the average flow velocity $v_{0.95}$ was at least $1 \times 10^{-4}$ m/sec., no fish eyes were observed in the fluororesin film. Since the melt flow rate of the copolymer (A1-5) at the temperature of the extrusion die and at a load of 49N was less than 7 g/10 min., ears breakage occurred, and the thickness precision was also inferior. Further, since the melt flow rate at the temperature of the extrusion die and at a load of 49N was less than 7 g/10 min., the fluororesin films of 25 μm and 12 μm in thickness had ears breakage significantly, and could not be molded.

In Ex. 32 wherein the temperature of the extrusion die exceeded 355° C., fish eyes occurred in the fluororesin film after 3 hours from the initiation of the production. Further, since the melt flow rate was less than 7 g/10 min, ears breakage occurred, and the thickness precision was also inferior.

Ex. 33

As a copper foil, an electrolytic copper foil (manufactured by Fukuda Metal Foil & Powder Co., Ltd., CF-T4X-SVR-12, thickness: 12 μm, Rz: 1.2 μm) was prepared.

The fluororesin film having a thickness of 25 μm, obtained in Example 11, and the copper foil, were laminated in the order of film/foil/film and pressed under conditions of a temperature 360° C. and a pressure of 1.3 MPa for 10 minutes, to obtain a composite film of the 3-layer structure.

From the composite film, a test piece of 25 mm in width was cut out. The interface between the fluororesin film on one side and the copper foil, was peeled in a direction of 180 degrees at a tensile rate of 50 mm/min. by means of a tensile tester (manufactured by A&D Company, Limited, product name: TENSILON), and the maximum load per 1 cm width was taken as the peel strength. The peel strength was 12 N/cm.

Ex. 34

A composite film was obtained in the same manner as in Ex. 33, except that the fluororesin film was changed to the fluororesin film with a thickness of 25 μm obtained in Ex. 14, and the peel strength was measured. The peel strength was 5.5 N/cm.

INDUSTRIAL APPLICABILITY

The fluororesin film of the present invention is useful as a metal-clad laminate having a glass cloth and a metal foil (such as a copper foil) bonded via an adhesive fluororesin film; a flexible metal-clad laminate having a heat-resistant resin film (such as a polyimide film) and a metal foil bonded via an adhesive fluororesin film; a highly heat resistant radiation sheet having a metal foil and an adhesive fluororesin film laminated; a high frequency electronic substrate for e.g. a millimeter wave radar to prevent collision of human to a car; a basic constituent material for a high frequency electronic substrate requiring a low transmission loss, etc.

This application is a continuation of PCT Application No. PCT/JP2016/071905, filed on Jul. 26, 2016, which is based upon and claims the benefit of priority from Japanese Patent Application No. 2015-153854 filed on Aug. 4, 2015. The contents of those applications are incorporated herein by reference in their entireties.

REFERENCE SYMBOLS

1: T-die, 2: coat hanger type die, 10: die plate, 12: flow inlet, 14: manifold, 16: land, 18: lip, 20: die plate, 22: flow inlet, 24: manifold, 26: land, 28: lip, 100: extruder, 102: extrusion die, 104: film-form melt, 106: cooling roll, 108: fluororesin film.

What is claimed is:

1. A method for producing a fluororesin film, comprising extruding a fluororesin material comprising a melt-processable fluororesin through an extrusion die, wherein
   the temperature of the extrusion die is from 305 to 355° C., and
   the average flow velocity $v_{0.95}$ of the fluororesin material as obtained by formula (1) is at least $6.58 \times 10^{-4}$ m/sec.:

$$v_{0.95} = Q_{0.95}/A_{0.95} \quad (1)$$

wherein when a distance x from a flow inlet of the extrusion die to an end portion of a manifold of the extrusion die, is set to be 1,
   $Q_{0.95}$ is a flow rate (m³/sec.) of the fluororesin material flowing in the manifold at a position of x=0.95 from the flow inlet, and
   $A_{0.95}$ is a cross-sectional area (m²) of the manifold at a position of x=0.95 from the flow inlet.

2. The method for producing a fluororesin film according to claim 1, wherein a melt flow rate of the fluororesin at the temperature of the extrusion die and at a load of 49N, is at least 7 g/10 min.

3. The method for producing a fluororesin film according to claim 1, wherein a width of a lip opening of the extrusion die is from 0.5 to 3.0 mm.

4. The method for producing a fluororesin film according to claim 1, wherein the fluororesin is a copolymer having units derived from tetrafluoroethylene, units derived from a monomer having an adhesive functional group, and units derived from a fluorinated monomer which is other than the tetrafluoroethylene.

5. The method for producing a fluororesin film according to claim 4, wherein the monomer having an adhesive functional group has a cyclic acid anhydride group.

6. The method for producing a fluororesin film according to claim 4, wherein the fluorinated monomer is hexafluoropropylene or a monomer represented by $CF_2=CFOR^{f1}$, wherein $R^{f1}$ is a $C_{1-10}$ perfluoroalkyl group, or a group having an etheric oxygen atom between carbon atoms of a $C_{2-10}$ perfluoroalkyl group.

7. The method for producing a fluororesin film according to claim 1, wherein a melt flow rate of the fluororesin at the temperature of the extrusion die and at a load of 49N, is from 10 to 30 g/10 min.

8. The method for producing a fluororesin film according to claim 1, wherein a melt flow rate stability $S_{60}$ of the fluororesin as obtained by formula (2) is from 0.7 to 1.0:

$$S_{60} = MFR_{60}/MFR_0 \quad (2)$$

wherein $MFR_{60}$ is a melt flow rate of the fluororesin at the temperature of the extrusion die and at a load of 49N as measured with respect to the fluororesin after heating for 60 minutes at the temperature of the extrusion die in an air atmosphere, and
   $MFR_0$ is a melt flow rate of the fluororesin at the temperature of the extrusion die and at a load of 49N as measured with respect to the fluororesin before heating for 60 minutes at the temperature of the extrusion die.

9. The method for producing a fluororesin film according to claim 1, wherein a melt flow rate stability $S_{60}$ of the fluororesin as obtained by formula (2) is from 0.8 to 1.0:

$$S_{60} = MFR_{60}/MFR_0 \quad (2)$$

wherein $MFR_{60}$ is a melt flow rate of the fluororesin at the temperature of the extrusion die and at a load of 49N as measured with respect to the fluororesin after heating for 60 minutes at the temperature of the extrusion die in an air atmosphere, and
   $MFR_0$ is a melt flow rate of the fluororesin at the temperature of the extrusion die and at a load of 49N as measured with respect to the fluororesin before heating for 60 minutes at the temperature of the extrusion die.

10. The method for producing a fluororesin film according to claim 1, wherein a melt flow rate of the fluororesin at 372° C. and at a load 49N as measured in accordance with JIS K7210; 1999, is from 20 to 50 g/10 min.

11. The method for producing a fluororesin film according to claim wherein a melt flow rate of the fluororesin at 372° C. and at a load 49N as measured in accordance with JIS K7210; 1999, is from 30 to 50 g/10 min.

12. The method for producing a fluororesin film according to claim 2, wherein a melt flow rate stability $S_{60}$ of the fluororesin as obtained by formula (2) is from 0.7 to 1.3:

$$S_{60} = MFR_{60}/MFR_0 \quad (2)$$

wherein $MFR_{60}$ is a melt flow rate of the fluororesin at the temperature of the extrusion die and at a load of 49N as measured with respect to the fluororesin after heating for 60 minutes at the temperature of the extrusion die in an air atmosphere, and
   $MFR_0$ is a melt flow rate of the fluororesin at the temperature of the extrusion die and at a load of 49N as measured with respect to the fluororesin before heating for 60 minutes at the temperature of the extrusion die.

13. The method for producing a fluororesin film according to claim 2, wherein a melt flow rate of the fluororesin at 372° C. and at a load 49N as measured in accordance with JIS K7210; 1999, is from 20 to 70 g/10 min.

14. The method for producing a fluororesin film according to claim 1, wherein a melt flow rate stability $S_{60}$ of the fluororesin as obtained by formula (2) is from 0.7 to 1.3:

$$S_{60} = MFR_{60}/MFR_0 \quad (2)$$

wherein $MFR_{60}$ is a melt flow rate of the fluororesin at the temperature of the extrusion die and at a load of 49N as measured with respect to the fluororesin after heating for 60 minutes at the temperature of the extrusion die in an air atmosphere, and $MFR_0$ is a melt flow rate of the fluororesin at the temperature of the extrusion die and at a load of 49N as measured with respect to the fluororesin before heating for 60 minutes at the temperature of the extrusion die.

15. The method for producing a fluororesin film according to claim 12, wherein a melt flow rate of the fluororesin at 372° C. and at a load 49N as measured in accordance with JIS K7210; 1999, is from 20 to 70 g/10 min.

16. The method for producing a fluororesin film according to claim 1, wherein a melt flow rate of the fluororesin at 372° C. and at a load 49N as measured in accordance with JIS K7210; 1999, is from 20 to 70 g/10 min.

17. The method for producing a fluororesin film according to claim 14, wherein a melt flow rate of the fluororesin at 372° C. and at a load 49N as measured in accordance with JIS K7210; 1999, is from 20 to 70 g/10 min.

18. The method for producing a fluororesin film according to claim 1, wherein the fluororesin has an adhesive functional group.

19. The method for producing a fluororesin film according to claim 1, wherein the extrusion die is a coat hanger die.

20. The method for producing a fluororesin film according to claim 1, wherein the average flow velocity $v_{0.95}$ of the fluororesin material is from $6.58 \times 10^{-4}$ to $5 \times 10^{-2}$ m/sec.

* * * * *